June 7, 1932. O. W. INGRAM 1,862,403
AIR GAUGE
Filed Dec. 14, 1928
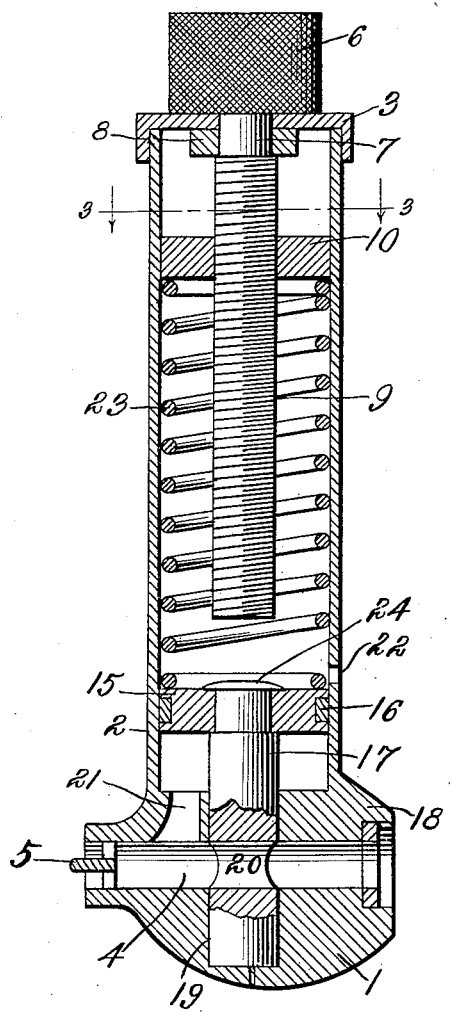

Patented June 7, 1932

1,862,403

UNITED STATES PATENT OFFICE

ORA W. INGRAM, OF CLEVELAND, OHIO

AIR GAUGE

Application filed December 14, 1928. Serial No. 326,101.

My present invention has reference to a tire pressure gauge, and my object is the provision of a cheaply constructed, extremely simple device for this purpose whereby an indicator may be set to permit of a desired pounds pressure of air being forced through the gauge into a tire to be inflated and which, when such pounds pressure have been received in the tire the air supply will be automatically cut off and the air in the gauge will be exhausted.

A further object is the provision of a device for this purpose which may be conveniently carried in an automobile and which may be easily and quickly adjusted to obtain the desired amount of pounds of pressure to be directed into the tire and which will be positively retained in such adjusted position.

To the attainment of the foregoing and other objects which will present themselves as the nature of the invention is better understood, the improvement also resides in certain other novel features of construction, combination and operative association of parts, one satisfactory embodiment of which is disclosed by the accompanying drawing.

In the drawing:

Figure 1 is an approximately central longitudinal sectional view through the improvement.

Figure 2 is a side elevation thereof.

Figure 3 is a transverse sectional view approximately on the line 3—3 of Figure 1.

As disclosed by the drawing my improved tire gauge includes a head 1 from which extends a tubular body 2. The body 2 has its outer end closed by a flanged cap 3. The head 1 is centrally formed with a transverse passage 4, and one or both ends of the said passage may be controlled by valves 5. One end of the passage is designed for the reception of the end of a tire valve casing and is also designed to unseat the valve in such casing, while the second end is designed to have attached thereto an air conducting hose.

On the outer face of the closure 3 there is a milled head 6 provided with a non-threaded shank portion 7 that is received through a central opening in the closure 3 and that has attached thereon a washer 8. Below the non-threaded portion the stem is threaded, as at 9, and the said threads are screwed through a nut or follower member 10 which is arranged in the casing 2 and which is held from rotary turning therein. The nut is formed with a preferably round extension 11 that passes through an elongated slot 12 in one side of the casing 2, and the said casing, at the opposite sides of the opening 12 has inscribed thereon numerals or like indicia 13 to indicate the pounds pressure of air to be let into a tire. The element 11 has its sides provided with indicator fingers 14 designed to aline with any of the indicating marks 13. Obviously when the milled head 6 is turned the nut or follower member 10 will be imparted a longitudinal movement in the casing 2, so that the indicating fingers 14 may be brought opposite any of the pounds pressure marks 13 on the casing.

Arranged in the casing 2 there is a piston head 15 that has an annular depression in its periphery for the reception of a piston ring 16. The piston is provided with a stem 17 that is guided through an opening in the partition 18 that divides the passage 4 from the cylindrical chamber 2, the said stem 17 also being received in a depression 19 in the head 1. The stem 17 is provided with a transverse port 20 which is normally in alinement with the passage 4 and the partition 18, in a line with the valved end of the passage 4 to which the air hose is connected, has a port 21 which communicates with the hollow cylindrical chamber 2.

Above the piston 15 the cylinder 2 is provided with an air port 22, and arranged to surround the threaded portion 9 of the stem and to exert a tension between the follower member or nut 10 and the inner face of the piston 15 there is a helical spring 23 of a desired and determined strength.

The milled head, as previously stated, is turned to cause the follower member to have its indicator fingers 14 brought opposite the indicator marks 13 on the casing 2 to determine the desired amount of pounds pressure of air to be inserted into a tire. After this is accomplished the head 1 is inserted on the valve stem of the tire to unseat the valve, and the air hose is connected with the second end of the head 1. The spring 23 is tensioned so that the same amount of pounds pressure of air entering the tire will pass through the passage 4 and port 21 into the cylinder 2 and this air will, of course, act against the piston 15. When the piston 15 has been moved a determined distance so that the same, or rather a head 24 on the piston, contacts with the end of the threaded portion 9 of the stem 7 the piston will have moved to bring its stem 17 into the cylinder 2 and to bring its port 20 out of register with the passage 4. It is to be stated that the stem 17 of the piston does not pass entirely through the socket or depression 19 provided therefor in the head 1 and likewise it is to be stated that the piston is held from turning so that the port 20 is at all times in register with the passage 4. When the supply of air from the air hose is thus shut off to the gauge the piston 15 will have passed beyond the port 22 and the air in the gauge will exhaust through the port. It is to be noted that the body of the improvement is in the nature of a substantially T-shaped casting which is round in cross section.

The simplicity of my construction and the advantages thereof will, it is thought, be understood and appreciated by those skilled in the art to which such invention relates so that further detailed description will not be required. Obviously I do not wish to be restricted to the precise details herein set forth, and, therefore, hold myself entitled to make such changes therefrom as fairly fall within the scope of what I claim.

Having described the invention, I claim:

An air gauge of the type described, comprising a substantially T-shaped casting which is round in cross section, and which has its longitudinal arm slotted longitudinally and provided with a bore and the lateral arm being provided with a transverse passage, the wall between the bore and passage having a round opening therethrough which extends into the lower wall provided by the passage, and said division wall being further provided with a port that establishes a communication between the bore and passage, a piston in the bore having a stem extending through the central opening thereof and entering the opening in the lateral arm of the casting, and said stem having a transverse opening to register with the passage in said transverse arm, a bolt having a milled head revoluble on the outer end of the central longitudinal arm and held from movement other than turning thereon, a nut which is round in plan and which is received in the bore of the longitudinal arm and through which the bolt is screwed, said nut having a round extension that is received through the longitudinal opening in the said arm of the casting provided on its sides, adjacent to its outer end, with oppositely disposed indicator fingers, and the casting, to the opposite side of the longitudinal slot having inscribed thereon marks for indicating pounds pressure of air received against the piston, a coil spring exerting a pressure between the nut and the piston, and the said longitudinal arm of the casting having an air outlet port disposed above the piston when the latter is in normal position.

In testimony whereof I affix my signature.

ORA W. INGRAM.